(12) United States Patent
Kiselev et al.

(10) Patent No.: US 7,509,567 B1
(45) Date of Patent: *Mar. 24, 2009

(54) SYSTEM AND METHOD FOR RESOLVING DATA INCONSISTENCIES WITH A DATA MAJORITY

(75) Inventors: Oleg Kiselev, Palo Alto, CA (US); Ron Karr, Palo Alto, CA (US); John Colgrove, Los Altos, CA (US)

(73) Assignee: Symantec Operating Corporation, Cupertino, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 11/157,268

(22) Filed: Jun. 21, 2005

Related U.S. Application Data (63) Continuation of application No. 10/098,285, filed on Mar. 15, 2002, now Pat. No. 6,910,178.

(51) Int. Cl.
*G06F 11/08* (2006.01)
*G06F 7/02* (2006.01)

(52) U.S. Cl. .................................... 714/797; 714/819
(58) Field of Classification Search ............ 714/819, 714/797, 799, 718; 365/200, 201
See application file for complete search history.

(56) References Cited

U.S. PATENT DOCUMENTS

| 5,408,366 | A  | * | 4/1995 | Bentley et al. | 360/53 |
| 6,711,558 | B1 | * | 3/2004 | Indeck et al. | 707/1 |
| 6,993,677 | B1 | * | 1/2006 | Wilner | 714/6 |

* cited by examiner

*Primary Examiner*—Phung M Chung
(74) *Attorney, Agent, or Firm*—Campbell Stephenson, LLP (57) ABSTRACT

A system and method for an election and data majority mechanism that solves problems such as bit flipping, mistracking, miscaching, and I/O status errors during real-time operations. Multiple copies of data are stored on various storage media of a data processing system. Errors that occur on the storage media or on other components of the data processing system are resolved by selecting the data with the highest frequency as the data majority. The data majority is propagated throughout the storage media to correct errors.

17 Claims, 8 Drawing Sheets

SYSTEM AND METHOD FOR RESOLVING DATA INCONSISTENCIES WITH A DATA MAJORITY

CROSS-REFERENCE TO RELATED APPLICATIONS

This application is a continuation of U.S. patent application Ser. No. 10/098,285, now U.S. Pat. No. 6,910,178, entitled "System and Method for Resolving Data Inconsistencies With A Data Majority," filed Mar. 15, 2002, and naming Oleg Kiselev, Ronald S. Karr and John A. Colgrove as inventors.

BACKGROUND

1. Field of the Invention

The present system and method relates generally to data management for computer systems, and in particular to a system and method for detecting and correcting data corruption on storage media.

2. Description of the Background Art

Conventionally, many computer systems utilize disk storage devices for permanent data storage. Originally, data storage demands grew proportionately with the number of disk storage devices. Over the past decade, greater data storage demands have led to a disproportionate increase in the number of disk storage devices.

A decrease in price of disk storage devices has helped computer system administrators add disk storage devices to satisfy the increased data storage demands. However, as the number of disk storage devices grew, data corruption across multiple disk storage devices became harder to detect and correct.

Disk storage devices are examples of storage media. Storage media is any component attached to a computer system that stores data. Specifically, disk storage devices are examples of storage media for permanent data storage. Other types of storage media can include random access memory (RAM) and volatile and non-volatile cache memory. Similar to disk storage devices, data corruption can occur in RAM and cache memory.

Figure 1:
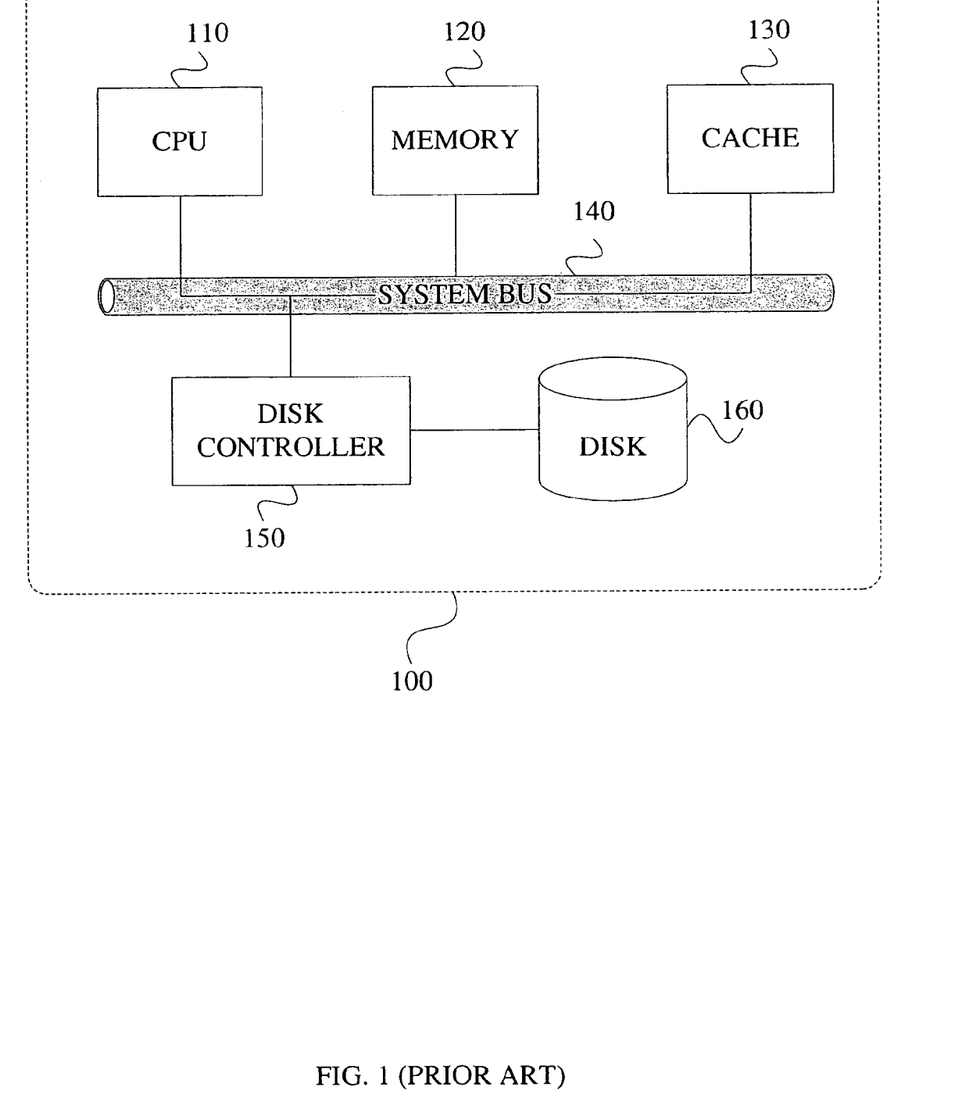
FIG. 1 is a block diagram of a physical configuration of a computer system.

FIG. 1 is a block diagram of a conventional computer system 100 with a typical physical configuration that includes a central processing unit (CPU) 110, a memory 120, a cache 130, a disk controller 150, and a disk 160. Exemplary storage media can include the memory 120, the cache 130, and the disk 160 for data storage. Typically, variations of the disk 160 can include a plurality of magnetic, optical, or other type of storage media for permanent data storage. Data can be stored on the memory 120, the cache 130, or the disk 160, all of which can be coupled to a system bus 140 to communicate with one another. However, volatile cache and the memory 120 may lose stored data when the computer system 100 experiences an electrical power loss. Conversely, non-volatile cache (NVRAM) and the disk 160 do not suffer data loss when the computer system 100 loses electrical power.

The disks 160 and disk data can be connected to multiple computer systems. The multiple computer systems include a primary computer system and at best one stand-by secondary computer system. If the primary computer system is unavailable, a clustering or a high availability (H/A) software ensures the availability of the disks 160 and disk data by transferring control (failover) to the stand-by secondary computer system. NVRAM will not lose data, but unlike the disks 160, NVRAM cannot be used for H/A or failovers. This diminishes NVRAM usefulness for preserving and assuring data correctness.

Figure 2:
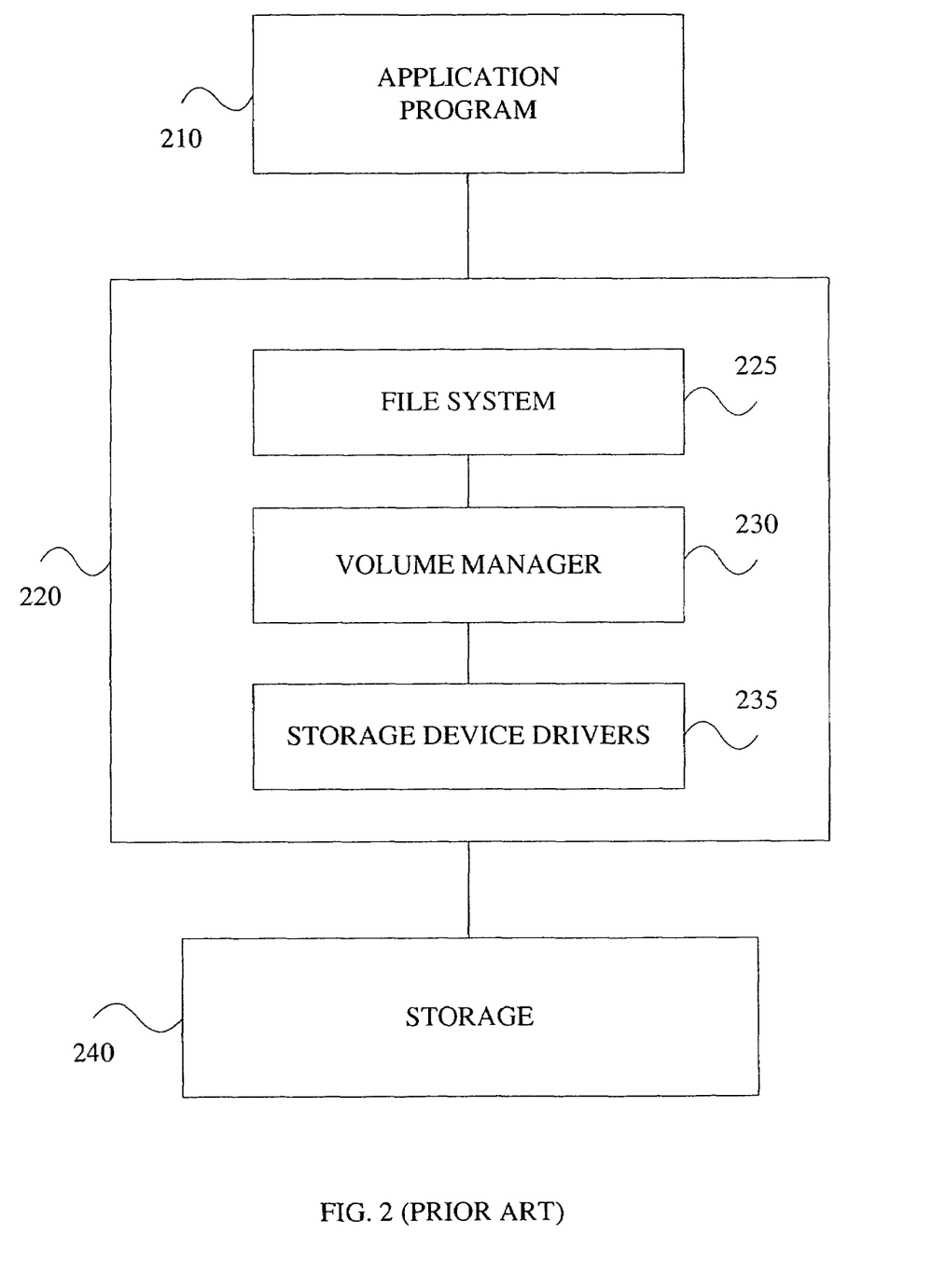
FIG. 2 is a block diagram of a logical configuration of a computer system.

FIG. 2 shows an exemplary logical configuration of the computer system 100 (FIG. 1). In contrast with the physical configuration of the computer system 100, such as the physical arrangement of the CPU 110 (FIG. 1) and the memory 120 (FIG. 1), the logical configuration is a user-conceptualized representation of the data and the computer system 100. As an example, a user can view the logical configuration of a data file as a group of data blocks on the disk 160 (FIG. 1) in one location. In reality, the physical configuration of the data blocks is not grouped at one location on the disk 160. Instead, the data blocks can be allocated randomly throughout the disk 160.

The exemplary logical configuration includes an application program 210, an operating system 220, and a storage 240. The operating system 220 further includes an optional file system 225, a volume manager 230, and optional storage device drivers 235. Often, the storage 240 includes the disk 160 variations. The application program 210 can be a computer program that generates system operations for the operating system 220. Typically, the operating system 220 instructs the CPU 110 to execute the system operations as instructions. When the operating system 220 generates instructions that require interaction with the storage 240 via the file system 225, the volume manager 230 maps the logical configuration of data that is represented on the storage 240 to the physical configuration of data on the disk 160 through the storage device drivers 235.

Some system operations are data read or data write operations, which require the CPU 110 to interact with the memory 120, the cache 130, the disk controller 150, or the disk 160. Referring to FIGS. 1 and 2, for example, the CPU 110 can execute a read instruction for a data read operation of data already stored on the disk 160. Alternatively, the read instruction may require the CPU 110 to read the data from the memory 120 and the cache 130. If data is not present in the memory 120 or the cache 130, a request is made for the data by the volume manager 230, which communicates through the storage device drivers 235 to the disk controller 150 and subsequently to the disk 160. Once the proper data is found, the data is returned to the application 210 that initiated the data read operation.

Figure 3A:
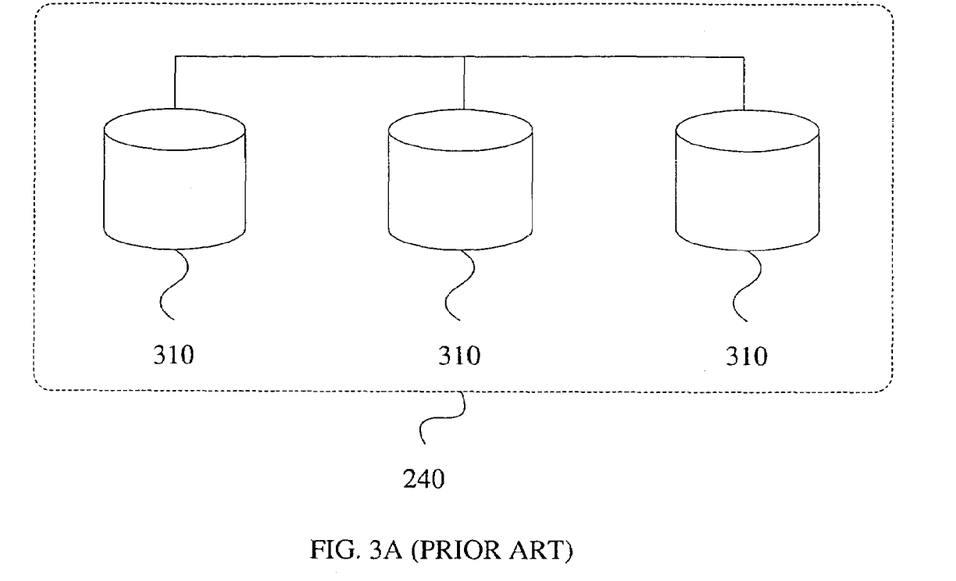
FIG. 3A is a diagram of one embodiment of the FIG. 2 storage.
Figure 3B:
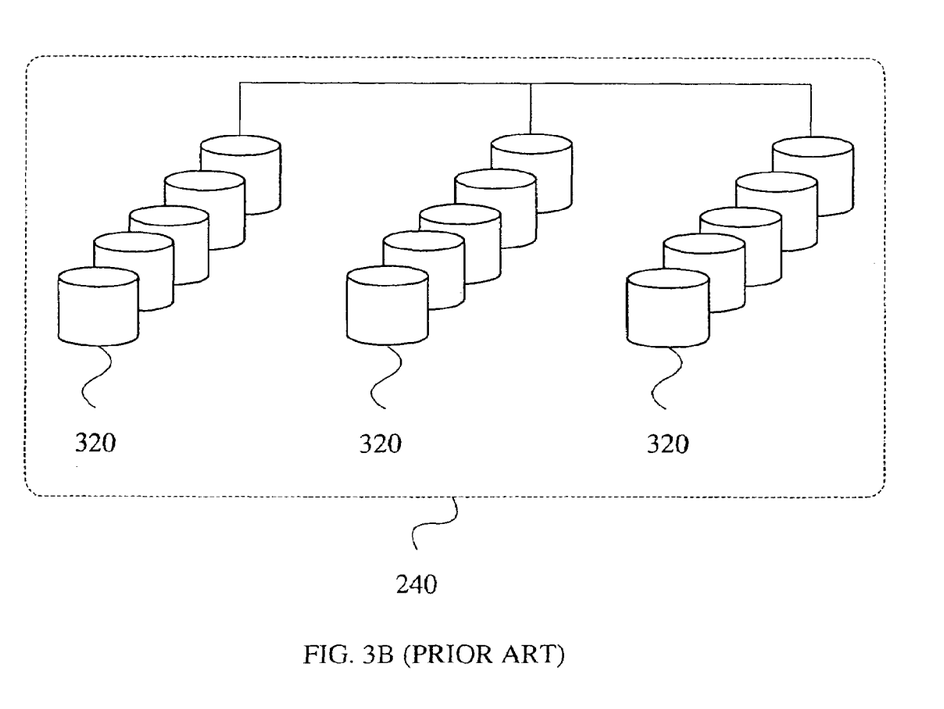
FIG. 3B is a diagram of another embodiment of the FIG. 2 storage.

The diagrams on FIG. 3A and FIG. 3B show further variations of the storage 240 (FIG. 2) mappings to the disk 160 (FIG. 1). Exemplary embodiments of the physical configuration can include three disks 310 coupled to one another as shown in FIG. 3A or three groups of disks 320 coupled to one another as shown in FIG. 3B. Alternatively, other variations in the number of disks 310 or groups of disks 320 can be utilized. Similar to the storage 240 of the disk 160 mapping, the volume manager 230 (FIG. 2) maps the logical configuration of data that is represented on the storage 240 to the physical configuration of data on the three disks 310 and three groups of disks 320.

Preferably, the data returned from a data read operation is error free. When an error occurs, however, the operating system 220 (FIG. 2) and the volume manager 230 correct the errors if they can be detected. Disadvantageously, as disk storage devices grow in number and size, more errors from system operations may occur that can be outside the ability of the operating system 220 or the volume manager 230 to detect or correct. Examples of these errors include bit flipping, mistracking, miscaching, and input/output (I/O) status errors.

Bit-flipping errors occur from data corruption on the disk 160 (FIG. 1), the disk controller 150 (FIG. 1), the CPU 110

(FIG. 1), or any other component of the computer system 100 (FIG. 1). The corruption causes bits in the data block to randomly flip, such as 0 to 1 or 1 to 0. For example, in a data block with "10110," the last two bits can be flipped to result in an erroneous value of "10101."

Mistracking errors occur during a data write operation when the data block is written to a wrong location of a component of the computer system 100. For example, the data block can be written to an incorrect location I on the disk 160 instead of a correct location C. Then, during a subsequent data read operation for the data in location C, the data returned is incorrect.

An example of a reporting error is a miscaching error. Typically, CPU 110 receives a report that data is present in a cache 130 (FIG. 1). However, in one type of miscaching error, the cache 130 may lose the data and still report the presence of the data. Therefore, when a read of the cache 130 is attempted, no data can be found. In another type of miscaching error, the data returned from the cache 130 is incorrect.

Another type of reporting error is the I/O status error, which incorrectly reports the status of the disk 160 (FIG. 1) to the CPU 110. For example, valid data can exist in a location V. However, with an I/O status error, the disk 160 or disk controller 150 (FIG. 1) can report invalid data at location V to the CPU 110. The result is the erroneous information that invalid data exists at location V that can subsequently be overwritten by other data.

When errors occur such as those described above, a simple solution known in the art to ensure valid data availability is mirroring. Mirroring is the duplication of data during real-time system operations on any storage media. For example, during a data write operation on the disk 160, a copy of the disk 160, called a mirror disk, receives the same data. Therefore, when data on the disk 160 is corrupted, the mirror disk is available to provide an uncorrupted copy of the data. Unfortunately, mirroring is not error-free. If mistracking or any of the errors described above occur during a synchronized data write operation, then it is difficult to discern which of the disk 160 and the mirror disk contains the valid data.

Another solution known in the art for avoiding errors is to establish a data striping solution that allocates data evenly across a set of disks 160 in combination with a backup. Data striped across a set of disks 160 behave as one disk 160. The backup is a copy of the data striped across the set of disks 160. If any disk fails on the set of disks 160, the missing data can be retrieved from the backup.

Unfortunately, even this solution does not solve bit-flipping errors. After a bit-flipping error, the data on the set of disks 160 is compared with the data on the backup, however, there is no known application-independent, general method to determine the correct data between the set of disks 160 and the backup. Typically, an application-dependent method to determine correct data between the set of disks 160 and the backup involves the use of a checksum within an application such as an Oracle® database server or a Microsoft® Exchange server. The checksum can be used to perform the comparison, but the checksum computation imposes a non-trivial overhead on the operating system 220 (FIG. 2) when performing I/O. The non-trivial overhead involves extra computations, which wastes valuable computer processing time.

Similarly, data stored among the different components of the computer system 100 (FIG. 1) such as the memory 120 (FIG. 1), the cache 130 (FIG. 1), or the disk 160 can also result in data inconsistencies. For example, data inconsistencies that occur between the memory 120 and the cache 130 are typically solved by cache coherence protocols such as snooping protocols and directory-based protocols. However, data inconsistencies among all the components of the computer system 100 are not solved by cache coherence protocols.

Therefore, what is needed is a technique that permits the logical configuration of a computer system to detect and correct errors that are not handled by existing techniques.

SUMMARY

The present system and method overcomes or substantially alleviates prior problems associated with data inconsistency and correction of storage media. In accordance with an exemplary embodiment of the present invention, a method is provided for resolving data inconsistencies on storage media by performing an election process and selecting a data majority. The method includes steps for establishing a plurality of mirrors and subsequently executing write and read instructions to and from the plurality of mirrors.

During a read instruction, data read from multiple mirrors are stored in multiple memory locations. The data from two mirrors are first compared. If the data matches, no data corruption has occurred. Alternatively, if the data from the first two mirrors do not match, then data from a third mirror will be read. Subsequently, a data majority is elected by selecting the data with the highest frequency. The highest frequency is determined with data comparisons of data stored in the multiple memory locations. Once a data majority is elected, the data majority is written to the mirrors that do not have the data majority, essentially overwriting corrupt data on these mirrors. If a data majority does not exist, return conditions are executed.

The data processing system for resolving data inconsistencies includes a plurality of mirrors, a volume manager, a read module that generates a plurality of read instructions from read operations, and a write module that generates a plurality of write instructions from write operations. The volume manager further comprises a read engine for executing the read instructions and a write engine for executing write instructions. Additionally, the volume manager has a comparator which compares data from at least two of the mirrors for a match and a majority engine for performing an election and selection of a data majority, which will be used to overwrite corrupt data on the plurality of mirrors.

DETAILED DESCRIPTION OF THE INVENTION

Figure 4:
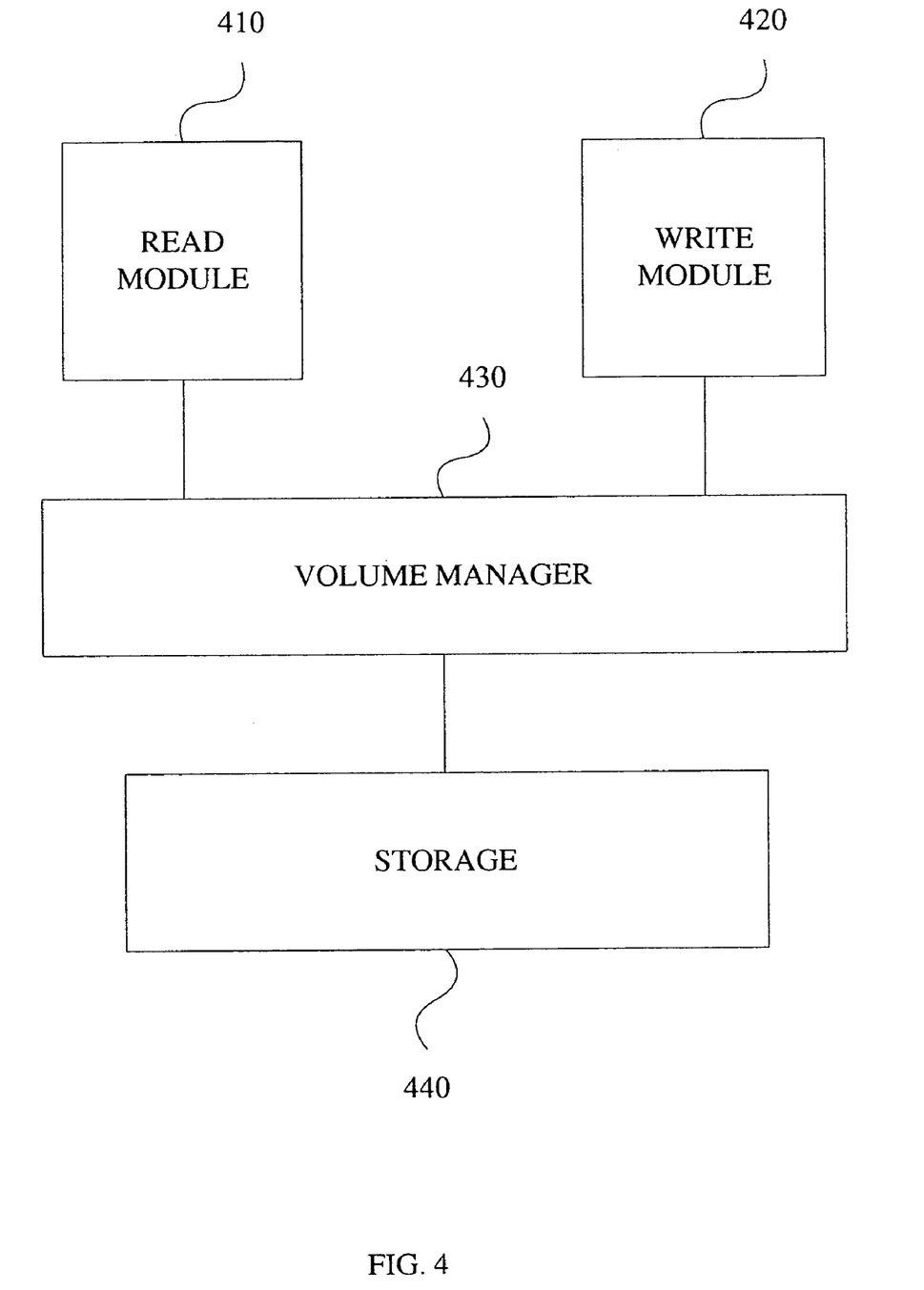
FIG. 4 is a block diagram of a logical configuration according to the present invention.

FIG. 4 illustrates a logical configuration of the present invention that permits multiple copies of data to be compared to solve data inconsistencies not handled by the prior art. Preferably, a read module 410, a write module 420, and a storage 440 are coupled to a volume manager 430. As in conventional systems, the storage 440 can include multiple mirrors that are a plurality of magnetic media such as disks, optical media such as compact disc or digital versatile disk, or other type of storage media for permanent data storage. Further, for the systems and methods described herein, the embodiments can also include the three disks 310 (FIG. 3A), the three groups of disk 320 (FIG. 3B), or other variations of these embodiments.

In one embodiment, the volume manager 430 interfaces with the storage 440. However, in other embodiments, the volume manger 430 can be replaced by any disk access software capable of reading data from the storage 440 into the memory 120 (FIG. 1) or writing data to the storage 440, without explicit instructions to perform the data read or data write operation from applications or other software.

System operations such as data read and data write operations interact with the read module 410 and the write module 420. The read module 410 and the write module 420 generate read and write instructions from data read and data write operations, respectively. The read and write instructions are subsequently forwarded to the volume manager 430 which reads and writes data from and to the storage 440, accordingly.

Figure 5:
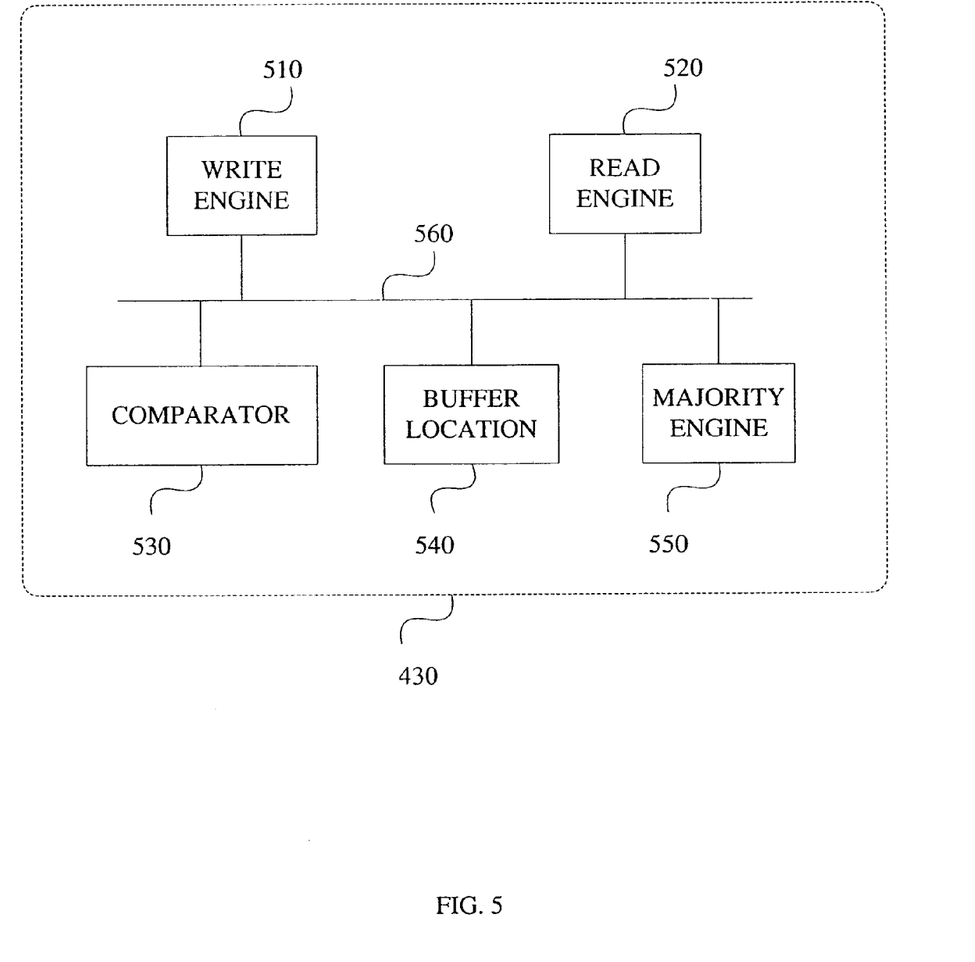
FIG. 5 is an exemplary block diagram of one embodiment of a volume manager, according to the present invention.

FIG. 5 shows the volume manager 430 including a write engine 510, a read engine 520, a comparator 530, a buffer location 540, and a majority engine 550, all coupled together via a communications bus 560. The write engine 510 and the read engine 520 receive write and read instructions, respectively, from the write module 420 (FIG. 4) and the read module 410 (FIG. 4). Further, the write engine 510 and the read engine 520 execute the write and read instructions that will be described in more detail in connection with FIGS. 6-8.

The write and read instructions are also communicated to other components in the volume manager 430 via the communications bus 560. As such, the volume manager 430 uses the comparator 530, the buffer location 540, and the majority engine 550 to execute write and read instructions propagated on the communications bus 560. The buffer location 540 stores the data read from the read instructions in memory locations such as RAM or data registers. In this exemplary embodiment, the comparator 530 compares the data obtained from multiple copies of data of the storage 440 (FIG. 4) during the execution of a read instruction. Should inconsistent data result from the comparison, the majority engine 550 will determine a correct set of data by an "election" process.

In the present invention, the election process is a series of steps that determine a data majority among multiple copies of data when data inconsistencies result. The data majority is deemed to be a correct set of data. Additionally, frequency is the number of times matching data appears on the storage media. Thus, the correct set of data in an election is determined by selecting the data with the highest frequency. For example, data W can appear 40% of the time, data X can appear 25% of the time, data Y can appear 20% of the time, and data Z can appear 15% of the time. In this example, data W is the data majority and is deemed the correct set of data among data sets W, X, Y, and Z. The election process in combination with the majority engine 550 will be discussed in more detail in connection with FIGS. 7 and 8.

Figure 6:
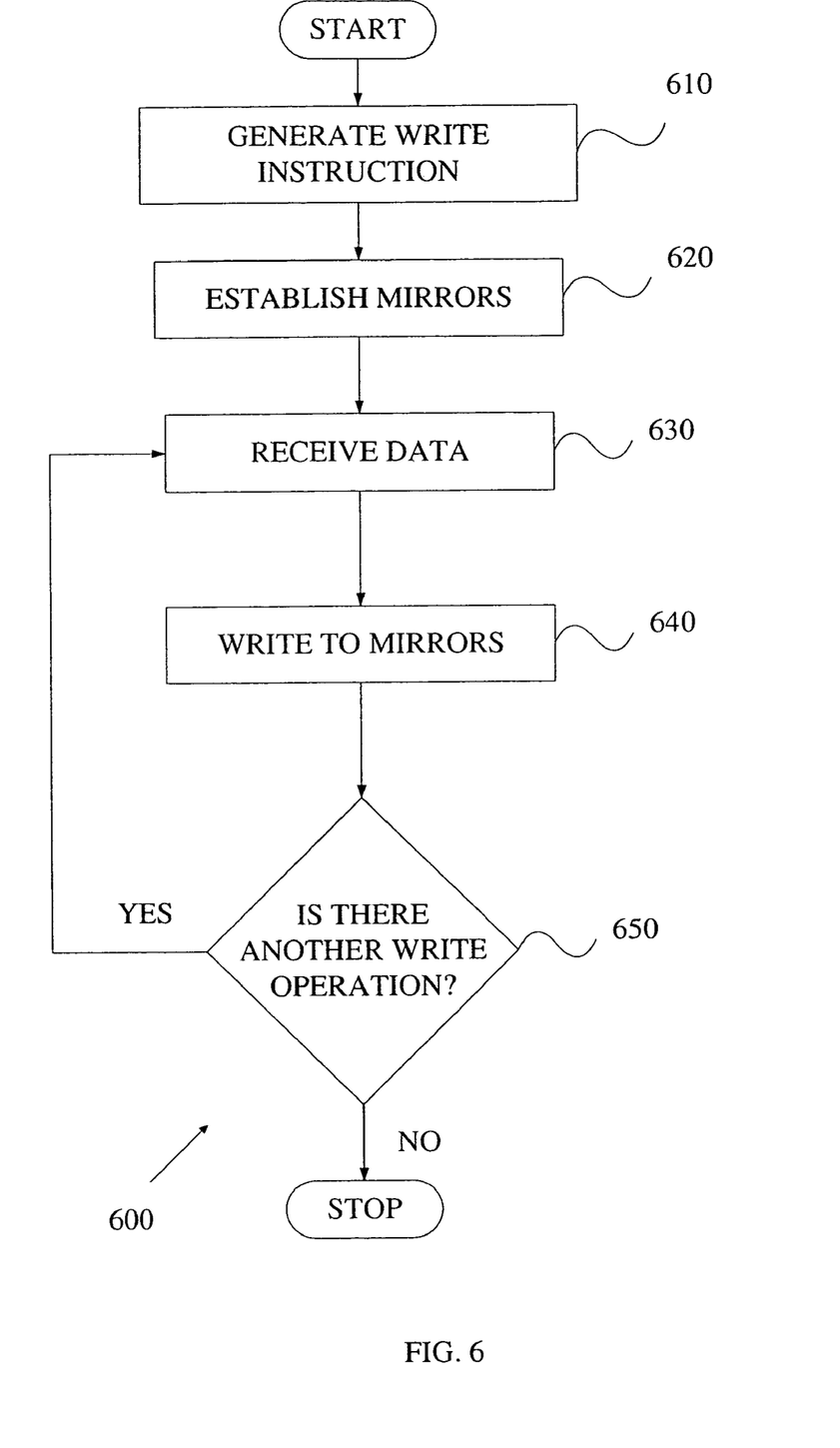
FIG. 6 is an exemplary flowchart of a method for writing data through the volume manager of FIG. 5.

FIG. 6 is a flowchart 600 illustrating an exemplary embodiment of a method for writing data to the storage 440 (FIG. 4) according to the present invention. Initially, in step 610, the write module 420 (FIG. 4) generates the write instruction for execution by the write engine 510 (FIG. 5). Subsequently, in step 620 mirrors are established. In the present embodiment, three mirrors are described; however, other variations in the number of mirrors or groups of the mirrors are contemplated. With regard to establishing the mirrors, a communication medium such as a Small Computer System Interface (SCSI) or an Integrated Drive Electronics (IDE) bus among the mirrors in the storage 440 can be employed.

Next, in step 630, the volume manager 430 (FIG. 4) receives data for the write instruction. Upon receiving the data, the volume manager 430 writes the data to the storage 440 and to appropriate mirrors in step 640.

After writing to the mirrors in step 640, the volume manager 430 must determine whether in step 650 another write operation exists. If another write operation does exist, because the write module 420 has generated a new write instruction for the write engine 510, the process returns to step 630. In step 630, the volume manager 430 receives data for this new write instruction. If no further write operations exist, then the write process is completed.

Figure 7:
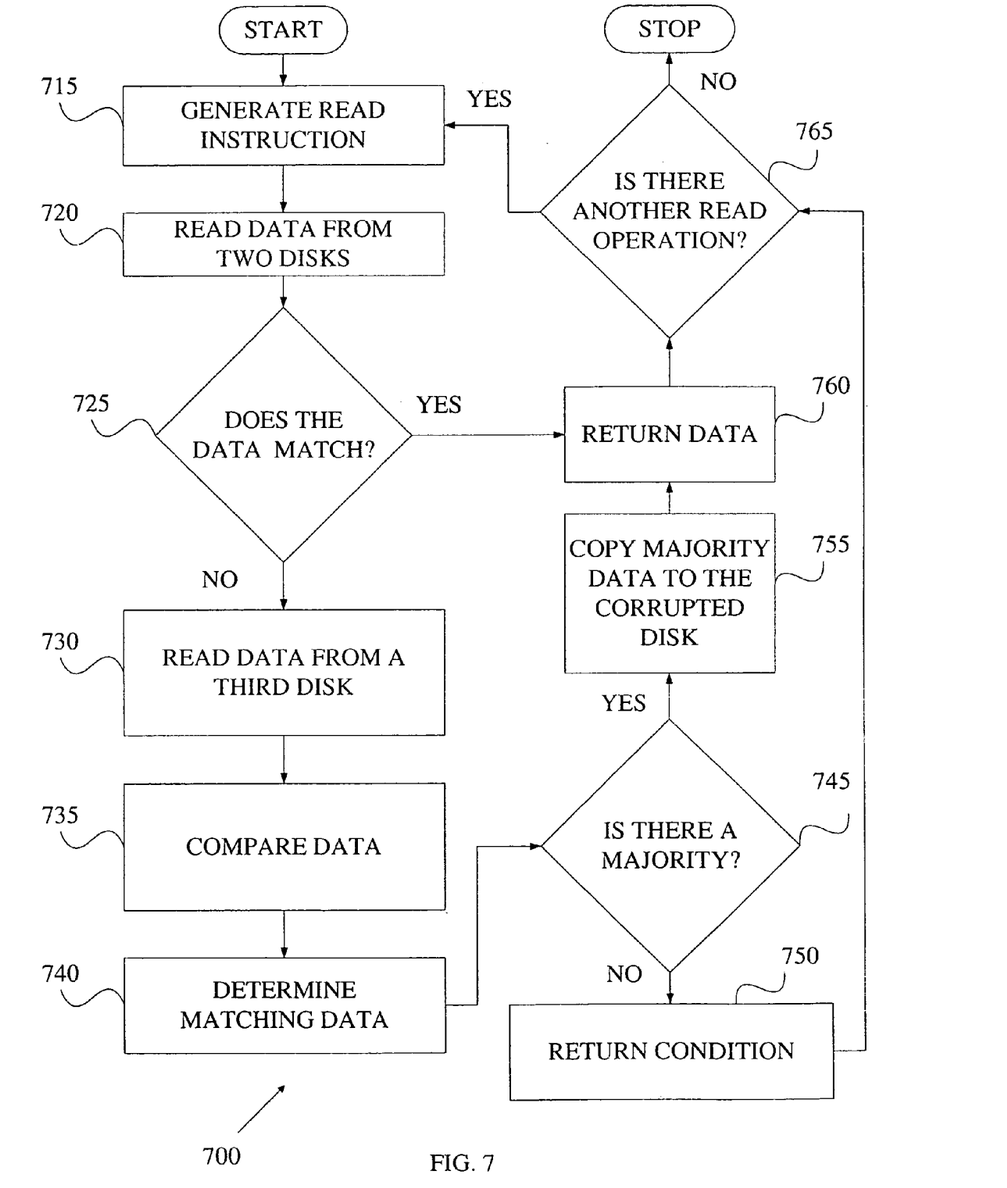
FIG. 7 is an exemplary flowchart of a method for reading data through the volume manager of FIG. 5.

FIG. 7 is a flowchart 700 illustrating an exemplary embodiment of a method for reading data according to the present invention. In step 715, the read module 410 (FIG. 4) generates the read instruction for execution by the read engine 520 (FIG. 5). Subsequently, in step 720, the data is read from a randomly selected first two disks of the three disks 310 (FIG. 3A). Further, the selection of the first two disks can be subject to proprietary performance enhancement algorithms. The data from a first disk is stored in a first memory location in the buffer location 540 (FIG. 5). Further, the data from a second disk is stored in a second memory location in the buffer location 540. Similarly, in other embodiments, the data can be read from a randomly selected first two groups of disks 320 (FIG. 3B) from among the three groups of disks 320 in the storage 440 (FIG. 4).

In step 725, the comparator 530 (FIG. 5) of the volume manager 430 (FIG. 4) determines whether the data read from the first two disks in step 720 match. If the data match, then the data is returned to the read module 410 (FIG. 4) in step 760. Further, in step 760, the second memory location is allocated as "free" memory for other uses, such as storing new data. In step 765, the volume manager 430 determines whether another read operation exists. If another read operation does exist, then the read module 410 generates a new read instruction for the read engine 520 in step 715, and the process is repeated until the volume manager 430 determines that no further read operations exist. Alternatively, if no further read operations exist, then the read process is completed.

However, if a data mismatch does occur in step 725, then a third disk is read in step 730. The data from the third disk is stored in a third memory location in the buffer location 540. Subsequently, in step 735, the data from the third disk is compared with the data retrieved from either of the first two disks. For example, the data from the third memory location can be compared with the data from the first memory location.

Next, in steps 740 and 745, a determination is made by the majority engine 550 (FIG. 5) as to which set of data among the disks is accurate. Thus, the data in the memory locations are compared with one another in step 740 and the data majority is determined in step 745. Specifically, the data with the highest frequency is the data majority of the election process. For example, if the data from the third memory location and the first memory location do not match, then the data from the third memory location and the data from the second memory location are compared. In this example with three sets of data, if there is a match between any two memory locations, then the matching data is the data majority.

With a data majority, in step 755, the majority engine 550 overwrites with the data majority the data on the disk categorized by the volume manager 430 as a corrupted disk. Once the corrupted disk is fixed, the data is returned to the read module 410 in step 760 and a check is made for further read operations in step 765.

Alternatively, if a data majority does not exist on the three disks 310, then two possible actions are performed in step 750. One action is to return an error condition to the volume manager 430. A second action is to disable two disks of the three disks 310 to prevent further read operations and write operations on those two disks. A third remaining disk is left enabled. Following the second action, the data from a memory location corresponding to the third disk is returned to the read module 410 indicating that a data majority does not exist. Subsequently, the volume manager 430 checks to see if there is another read operation in step 765. It should be noted that while the exemplary embodiment of FIG. 7 detects and corrects errors on two disks, those skilled in the art will recognize that the invention is not limited to two disks. In an alternative embodiment, the invention can be applied to the storage 440 (FIG. 4) containing multiple mirrors.

Figure 8:
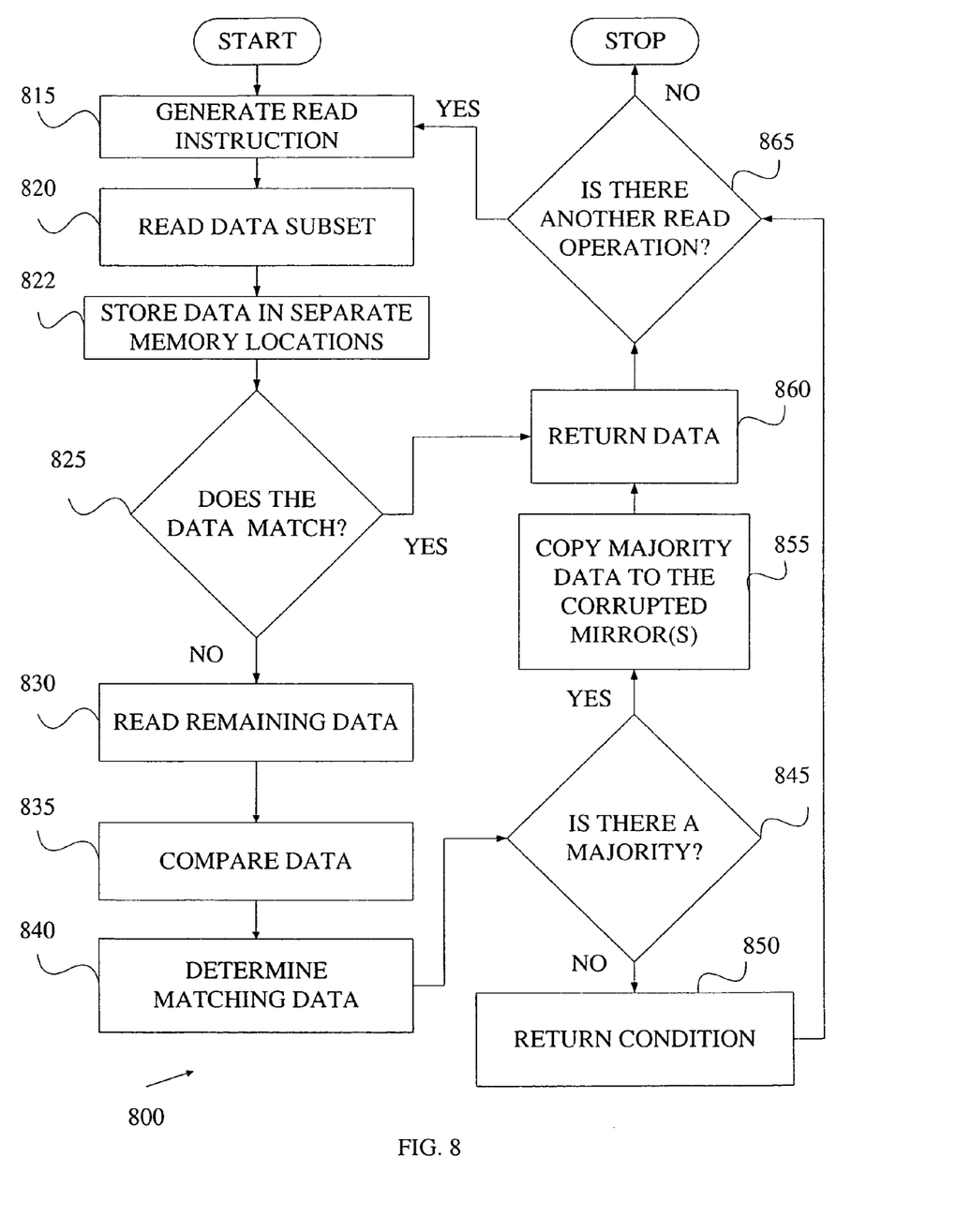
FIG. 8 is an exemplary flowchart of an alternative method for reading data through the volume manager of FIG. 5.

FIG. 8 is a flowchart 800 illustrating an alternative embodiment of a method for reading data, according to the present invention. A variation on the embodiment of FIG. 7 is an extension of the majority engine 550 (FIG. 5) to multiple copies of data on mirrors. Specifically, in step 815, the read module 410 (FIG. 4) generates a read instruction for execution by the read engine 520 (FIG. 5). Subsequently, a data subset is read in step 820 from the mirrors in the storage 440 (FIG. 4) that contain the data. The data subset is a smaller number of copies of data than the total number of multiple copies of data. For example, the present invention may have 100 total multiple copies of data, but the data subset may be only three copies of data. The data from the data subset are then stored in separate memory locations in the buffer location 540 (FIG. 5) in step 822.

In step 825, the comparator 530 (FIG. 5) of the volume manager 430 (FIG. 4) determines whether the data read from the multiple mirrors match. If the data match, then the data is returned to the read module 410 in step 860. Steps 860 and 865 subsequently perform the same functions as steps 760 and 765 of the method of FIG. 7.

However, if a data mismatch does occur in step 825, then the volume manager 430 must determine the correct data from the stored data in the memory locations in combination with any remaining data on the multiple mirrors. In steps 830, 835, 840, and 845, the election process is functionally similar to the previously described steps 730, 735, 740, and 745 of FIG. 7.

If a data majority is not selected, then two possible actions are performed in step 850. One action is to return an error condition to the volume manager 430. A second action is to disable all the mirrors except the first mirror to prevent further read operations and write operations on the mirrors and to return the data from the first memory location. Subsequently, the volume manager 430 checks to see if there is another read operation in step 865.

Alternatively, if the data majority exists, then the data majority overwrites data on the corrupted mirrors among the multiple mirrors in step 855. Once the corrupted mirrors are fixed, the data is returned to the read module 410 in step 860 and a check is made for further read operations.

The election and data majority mechanism in the embodiments described above solves problems such as bit flipping, mistracking, miscaching, and I/O status errors. In one embodiment, two mirrors are selected. If the two mirrors have equivalent data, then this data majority will be used to overwrite corrupted data. Because the probability of errors propagated on both randomly chosen mirrors is unlikely, the present invention overcomes previous problems with detection and correction of errors. Specifically, the probability of errors occurring across multiple mirrors is lowered as multiple disks 160 (FIG. 1) are added to a system implementing the embodiments described herein. Further, it is extremely unlikely that there will be more than one corrupted read from the same data location. In another embodiment, regardless of the number of mirrors, multiple copies of data are read to find the correct set of data. Correspondingly, the correct set of data is the data with the highest frequency.

Three disks 310 (FIG. 3A) or three groups of disks 320 (FIG. 3B) create triple mirroring embodying the methods previously described. In other embodiments, any number of disks or groups of disks can create multiple mirrors using the invention to solve errors. Further, when the computer system 100 (FIG. 1) stores multiple copies of the data among any component such as the memory 120 (FIG. 1), the cache 130 (FIG. 1), or the disk 160 (FIG. 1), data inconsistencies are resolved by selecting the data majority and propagating the data majority throughout the computer system 100.

The present invention has been described with reference to a preferred embodiment. Other embodiments will be apparent to those skilled in the art in light of this disclosure. For example, the invention can be readily implemented using configurations other than those described. Additionally, the invention can effectively be used in combination with systems other than the one described. Therefore, these and other variations upon the preferred embodiment are within the scope of the present invention, which is limited only by the appended claims.

What is claimed is:

1. A system comprising:
 a read engine, wherein
  said read engine is configured to be coupled to a storage device,
  said storage device is configured to store a plurality of copies of data, and
  said read engine is configured to read a first copy of said data, a second copy of said data, and a third copy of said data from said copies of said data;
 a comparator, wherein
  said comparator is coupled to said read engine, and
  said comparator is configured to determine an occurrence of a data match between at least two of said first copy of data, said second copy of data, and said third copy of said data by virtue of being configured to compare said first copy of data, said second copy of data, and said third copy of said data to one another;
 a majority engine, wherein
  said majority engine is coupled to said comparator, and
  said majority engine is configured to determine a data majority among said first copy of said data, said second copy of said data, and said third copy of said data based on said occurrence of said data match; and
 a volume manager, wherein
  said volume manager is configured to
   if said data majority cannot be determined,
    select a selected one of said copies of said data, and
    disable copies of said data other than said selected one of said copies of said data.

2. The system of claim 1, further comprising:
 a storage device, wherein
  said storage device is configured to store said copies of said data.

3. The system of claim 1, further comprising:
a plurality of said storage devices, wherein
- said storage devices comprise said storage device, and
- each of said storage devices is configured to store a corresponding copy of said data from said copies of said data.

4. The system of claim 3, further comprising:
a plurality of memory locations, wherein
- each of said memory locations is configured to store data read from a corresponding one of said storage devices.

5. The system of claim 2, wherein
said majority engine is further configured to determine said data majority using a highest frequency of said data match.

6. The system of claim 1, further comprising:
a write engine, wherein
- said write engine is coupled to said storage device,
- said write engine is configured to maintain data consistency by virtue of being configured to overwrite a copy of said copies of said data with another copy of said copies of said data,
- said copy of said copies of said data is not in said data majority, and
- said another copy of said copies of said data is in said data majority.

7. The system of claim 1, further comprising:
a write engine, wherein
- said write engine is coupled to said storage device, and
- said write engine is configured to store said copies of said data on said storage device by virtue of being configured to write said copies of said data to said storage device.

8. The system of claim 1, wherein
said first copy of data, said second copy of data, and said third copy of said data are randomly selected from said copies of said data.

9. A method comprising:
resolving a data inconsistency in a data processing system, wherein
- said resolving comprises determining a data majority, and
- said determining said data majority comprises
  - reading a plurality of a plurality of copies of data stored in a storage device,
  - determining an occurrence of a data match by comparing said plurality of said copies of said data to one another,
  - if said data match has not been determined to have occurred,
    - reading a remaining copy of said copies of said data, and
    - determining said occurrence of said data match, wherein
      - said determining said occurrence of said data match comprises comparing said plurality of said copies of said data to one another, and
      - said remaining copy of said copies of said data is caused to be among said plurality of said copies of said data by said reading said remaining copy of said copies of said data, and
  - if said data majority cannot be determined,
    - selecting a selected one of said copies of said data, and
    - disabling copies of said data other than said selected one of said copies of said data.

10. The method of claim 9, further comprising:
returning data from a memory location corresponding to said selected one of said copies of said data.

11. The method of claim 10, further comprising:
returning an error condition, if said data majority cannot be determined.

12. The method of claim 10, further comprising:
overwriting one of said copies of said data other than said selected one of said copies of said data with said selected one of said copies of said data.

13. The method of claim 10, further comprising:
overwriting a corrupted one of said copies of said data with said data majority.

14. An apparatus comprising:
means for resolving a data inconsistency in a data processing system, wherein
- said means for resolving comprises means for determining a data majority, and
- said means for determining said data majority comprises
  - means for reading a plurality of a plurality of copies of data stored in a storage device,
  - means for determining an occurrence of a data match comprising means for comparing said plurality of said copies of said data to one another,
  - means, if said means for determining said occurrence of said data match has not determined said occurrence of said data match, for
    - reading a remaining copy of said copies of said data, and
    - determining said occurrence of said data match, wherein
      - said means for determining said occurrence of said data match comprises means for comparing said plurality of said copies of said data to one another, and
      - said remaining copy of said copies of said data is caused to be among said plurality of said copies of said data by said means for reading said remaining copy of said copies of said data, and
  - means, if said data majority cannot be determined, for
    - selecting a selected one of said copies of said data, and
    - disabling copies of said data other than said selected one of said copies of said data.

15. The apparatus of claim 14, further comprising:
means for returning data from a memory location corresponding to said selected one of said copies of said data.

16. The apparatus of claim 15, further comprising:
means for returning an error condition, if said data majority cannot be determined.

17. The apparatus of claim 15, further comprising:
means for overwriting a corrupted one of said copies of said data with said data majority.

* * * * *